(12) United States Patent
Isaacs

(10) Patent No.: US 12,504,869 B2
(45) Date of Patent: Dec. 23, 2025

(54) COMPUTER-ASSISTED GRAPHICAL DEVELOPMENT TOOLS

(71) Applicant: Roblox Corporation, San Mateo, CA (US)

(72) Inventor: Paul Isaacs, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 59 days.

(21) Appl. No.: 18/243,510

(22) Filed: Sep. 7, 2023

(65) Prior Publication Data
US 2024/0086050 A1    Mar. 14, 2024

Related U.S. Application Data

(60) Provisional application No. 63/404,934, filed on Sep. 8, 2022.

(51) Int. Cl.
*G06F 3/04845* (2022.01)

(52) U.S. Cl.
CPC ................ *G06F 3/04845* (2013.01)

(58) Field of Classification Search
CPC .................................................. G06F 3/04845
See application file for complete search history.

(56) References Cited

U.S. PATENT DOCUMENTS

| | | | |
|---|---|---|---|
| 6,448,964 B1 | 9/2002 | Isaacs et al. | |
| 8,863,016 B2 * | 10/2014 | Victor | G06F 3/04883 715/769 |
| 8,972,879 B2 * | 3/2015 | Migos | G06F 3/04883 715/702 |
| 11,978,152 B2 * | 5/2024 | Anon | G06F 3/0485 |
| 2010/0262907 A1 | 10/2010 | Shoemaker et al. | |
| 2012/0210261 A1 * | 8/2012 | Sarnoff | G06F 3/04883 715/765 |
| 2014/0055372 A1 * | 2/2014 | Grieve | G06F 3/041 345/173 |
| 2014/0129990 A1 * | 5/2014 | Xin | G06F 3/04815 715/849 |
| 2018/0130256 A1 * | 5/2018 | Wampler | G06T 19/20 |
| 2019/0087073 A1 | 3/2019 | Ruby et al. | |
| 2019/0354279 A1 * | 11/2019 | Feinberg | G06F 3/04855 |
| 2020/0379626 A1 * | 12/2020 | Guyomard | G06F 3/0488 |

(Continued)

OTHER PUBLICATIONS

USPTO, International Search Report for International Patent Application No. PCT/US2023/032201, Nov. 20, 2023, 2 pages.

(Continued)

*Primary Examiner* — Tadesse Hailu
(74) *Attorney, Agent, or Firm* — IP Spring

(57) ABSTRACT

Implementations described herein relate to methods, systems, and computer-readable media for computer-assisted graphical development. In some implementations, a computer-implemented method includes providing a first graphical user interface (GUI) that includes at least one manipulable graphical object, receiving a request to implement a movement feature for the at least one manipulable graphical object, and in response to the request, automatically positioning a movement detector object in relation to the at least one manipulable graphical object and logically coupling the movement detector object to the at least one manipulable graphical object.

20 Claims, 8 Drawing Sheets

(56) References Cited

U.S. PATENT DOCUMENTS

| | | | |
|---|---|---|---|
| 2021/0012574 A1* | 1/2021 | Fu | G06F 3/017 |
| 2022/0080299 A1* | 3/2022 | Huang | G06F 3/04883 |
| 2022/0392150 A1* | 12/2022 | Anon | G06T 19/20 |
| 2023/0051531 A1* | 2/2023 | Huang | G06F 3/04883 |

OTHER PUBLICATIONS

USPTO, Written Opinion for International Patent Application No. PCT/US2023/032201, Nov. 20, 2023, 7 pages.

"International Preliminary Report on Patentability in International Application No. PCT/US2023/032201", Mar. 20, 2025, 5 pages.

* cited by examiner

COMPUTER-ASSISTED GRAPHICAL DEVELOPMENT TOOLS

CROSS-REFERENCE TO RELATED APPLICATIONS

This application claims the benefit of priority to U.S. Provisional Application Ser. No. 63/404,934, filed on Sep. 8, 2022, entitled "COMPUTER-ASSISTED GRAPHICAL DEVELOPMENT TOOLS," the entire contents of which are hereby incorporated by reference herein.

TECHNICAL FIELD

Embodiments relate generally to computer-aided design, and more particularly, to methods, systems, and computer readable media for computer-assisted graphical development tools.

BACKGROUND

Graphical development tools, such as computer-aided design tools, include virtual gripping tools that help in aligning virtual objects such as rectangles, ellipses, and other shapes. Generally, these tools are fixed onto a virtual object and when manipulated, e.g., while depressing a key upon the gripper tool and moving a cursor, the virtual object may be moved in three-dimensional (3D) space (e.g., sliding, lifting, dragging, etc.). However, implementing a similar motion (e.g., moving a virtual object by sliding, pushing, pulling, etc.) within a virtual experience with an avatar poses challenges. For example, it may be difficult for virtual experience developers to develop computer-executable code that implements similar features to the virtual gripping tools within a virtual experience such that avatars can easily move virtual objects in a similar manner as computer-aided design tools.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to an aspect, a computer-implemented method is provided. The method includes: computer-implemented method, comprising: providing a first graphical user interface (GUI) that includes at least one manipulable graphical object, the at least one manipulable graphical object having at least one edge or vertex and being associated with a virtual pivot point; providing a dragger handle proximate the at least one manipulable graphical object in the first GUI, the dragger handle operable via user input to alter a location of the at least one manipulable graphical object based on the virtual pivot point; receiving a request to implement a movement feature for the at least one manipulable graphical object, wherein the movement feature includes motion of the at least one manipulable graphical object within a virtual experience by an avatar; in response to the request, automatically positioning a movement detector object in relation to the at least one manipulable graphical object and logically coupling the movement detector object to the at least one manipulable graphical object, wherein the movement detector object is oriented along a path of motion defined in the request, wherein the movement detector object is operable to detect interactions of the avatar with the at least one manipulable graphical object within the virtual experience, and wherein the movement detector object is configured to direct motion of the at least one manipulable graphical object along the path of motion in relation to the virtual pivot point; and providing the at least one manipulable graphical object and the movement detector in the virtual experience presented in a second GUI, wherein interaction with the at least one manipulable graphical object by the avatar within the virtual experience triggers the movement detector object and causes automatic presentation of motion of the at least one manipulable graphical object along the path of motion during the interaction.

Various implementations of the computer-implemented method are described.

According to some implementations, the dragger handle is configured to be displayed in the first GUI and is not displayed in the second GUI, and wherein the movement detector object is a hidden object that is not displayed in the first GUI and is not displayed in the second GUI.

According to some implementations, receiving the request comprises receiving the path of motion, a minimum position change value, and a maximum position change value.

According to some implementations, the minimum position change value and the maximum position change value denote threshold positions along the path of motion where the at least one manipulable graphical object cannot travel beyond.

According to some implementations, the at least one manipulable graphical object is a three-dimensional (3D) object, wherein providing the dragger handle comprises providing two or more dragger handles along two or more distinct paths of motion, and wherein receiving the request comprises receiving a selection of one of the two or more distinct paths of motion.

According to some implementations, the path of motion is: a linear path, an arcuate path, or an axis of rotation configured in relation to one or more of: the virtual pivot point, or the at least one edge or vertex.

According to some implementations, the automatic presentation of motion of the at least one manipulable graphical object along the path of motion within the virtual experience comprises rendering the motion along the path of motion, and wherein, when the interaction ceases, the at least one manipulable graphical object is rendered at rest proximate a point of last interaction.

According to some implementations, the interaction with the at least manipulable graphical object by the avatar within the virtual experience comprises one or more of: pushing, pulling, lifting, sliding, or rotating.

According to some implementations, the automatic presentation of motion of the at least one manipulable graphical object along the path of motion within the virtual experience during the interaction comprises rendering the motion along the path of motion, and, if the at least one manipulable graphical object is above a ground level when the interaction ceases, rendering the at least one manipulable graphical object falling to the ground level or into a nearest object below the at least one manipulable graphical object.

According to some implementations, the movement detector object is a hidden virtual object that comprises one or more of: data representing the path of motion, data describing the virtual pivot point, a minimum position change value in relation to the virtual pivot point and the path of motion, or a maximum position change value in relation to the virtual pivot point and the path of motion.

According to some implementations, the movement detector object comprises computer-executable code that automatically detects proximity of the avatar to the at least one edge or vertex in the second GUI.

According to some implementations, the movement detector object is a first movement detector object, wherein the path of motion is a first path of motion, wherein the request is a first request, and wherein the computer-implemented method further comprises: receiving a second request to implement a second movement feature for the at least one manipulable graphical object; in response to the second request, automatically positioning a second movement detector object in relation to the at least one manipulable graphical object and logically coupling the second movement detector object to the at least one manipulable graphical object, wherein the second movement detector object is oriented along a second path of motion defined by the second request, wherein the second movement detector object is operable to detect avatar interactions with the at least one manipulable graphical object within the virtual experience, and wherein the second movement detector object is configured to direct motion of the at least one manipulable graphical object along the second path of motion in relation to the virtual pivot point; and providing the at least one manipulable graphical object, the first movement detector, and the second movement detector in the virtual experience, wherein interaction with the at least manipulable graphical object by an avatar within the virtual experience triggers the first movement detector and the second movement detector, and causes an automatic presentation of motion of the at least one manipulable graphical object along one or both of the first path of motion and the second path of motion within the virtual experience during the interaction.

According to another aspect, a system is described, comprising: a memory with instructions stored thereon; and a processing device, coupled to the memory and operable to access the memory, wherein the instructions, when executed by the processing device, cause the processing device to perform operations including: providing a first graphical user interface (GUI) that includes at least one manipulable graphical object, the at least one manipulable graphical object having at least one edge or vertex and being associated with a virtual pivot point; providing a dragger handle proximate the at least one manipulable graphical object in the first GUI, the dragger handle operable via user input to alter a location of the at least one manipulable graphical object based on the virtual pivot point; receiving a request to implement a movement feature for the at least one manipulable graphical object, wherein the movement feature includes motion of the at least one manipulable graphical object within a virtual experience by an avatar; in response to the request, automatically positioning a movement detector object in relation to the at least one manipulable graphical object and logically coupling the movement detector object to the at least one manipulable graphical object, wherein the movement detector object is oriented along a path of motion defined in the request, wherein the movement detector object is operable to detect interactions of the avatar with the at least one manipulable graphical object within the virtual experience, and wherein the movement detector object is configured to direct motion of the at least one manipulable graphical object along the path of motion in relation to the virtual pivot point; and providing the at least one manipulable graphical object and the movement detector in the virtual experience presented in a second GUI, wherein interaction with the at least manipulable graphical object by the avatar within the virtual experience triggers the movement detector object and causes automatic presentation of motion of the at least one manipulable graphical object along the path of motion during the interaction.

Various implementations of the system are described.

According to some implementations, the dragger handle is configured to be displayed in the first GUI and is not displayed in the second GUI, and wherein the movement detector object is a hidden object that is not displayed in the first GUI and is not displayed in the second GUI.

According to some implementations, receiving the request comprises receiving the path of motion, a minimum position change value, and a maximum position change value.

According to some implementations, the minimum position change value and the maximum position change value denote threshold positions along the path of motion where the at least one manipulable graphical object cannot travel beyond.

According to some implementations, the at least one manipulable graphical object is a three-dimensional (3D) object, wherein providing the dragger handle comprises providing two or more dragger handles along two or more distinct paths of motion, and wherein receiving the request comprises receiving a selection of one of the two or more distinct paths of motion.

According to some implementations, the path of motion is: a linear path, an arcuate path, or an axis of rotation configured in relation to one or more of: the virtual pivot point, or the at least one edge or vertex.

According to some implementations, the automatic presentation of motion of the at least one manipulable graphical object along the path of motion within the virtual experience comprises rendering the motion along the path of motion, and wherein, when the interaction ceases, the at least one manipulable graphical object is rendered at rest proximate a point of last interaction.

According to another aspect, a non-transitory computer-readable medium is described with instructions stored thereon that, responsive to execution by a processing device, causes the processing device to perform operations comprising: providing a first graphical user interface (GUI) that includes at least one manipulable graphical object, the at least one manipulable graphical object having at least one edge or vertex and being associated with a virtual pivot point; providing a dragger handle proximate the at least one manipulable graphical object in the first GUI, the dragger handle operable via user input to alter a location of the at least one manipulable graphical object based on the virtual pivot point; receiving a request to implement a movement feature for the at least one manipulable graphical object, wherein the movement feature includes motion of the at least one manipulable graphical object within a virtual experience by an avatar; in response to the request, automatically positioning a movement detector object in relation to the at least one manipulable graphical object and logically coupling the movement detector object to the at least one manipulable graphical object, wherein the movement detector object is oriented along a path of motion defined in the request, wherein the movement detector object is operable to detect interactions of the avatar with the at least one manipulable graphical object within the virtual experience, and wherein the movement detector object is configured to direct motion of the at least one manipulable graphical object along the path of motion in relation to the virtual pivot point;

and providing the at least one manipulable graphical object and the movement detector in the virtual experience presented in a second GUI, wherein interaction with the at least manipulable graphical object by the avatar within the virtual experience triggers the movement detector object and causes automatic presentation of motion of the at least one manipulable graphical object along the path of motion during the interaction.

Various implementations of the non-transitory computer-readable medium are described.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
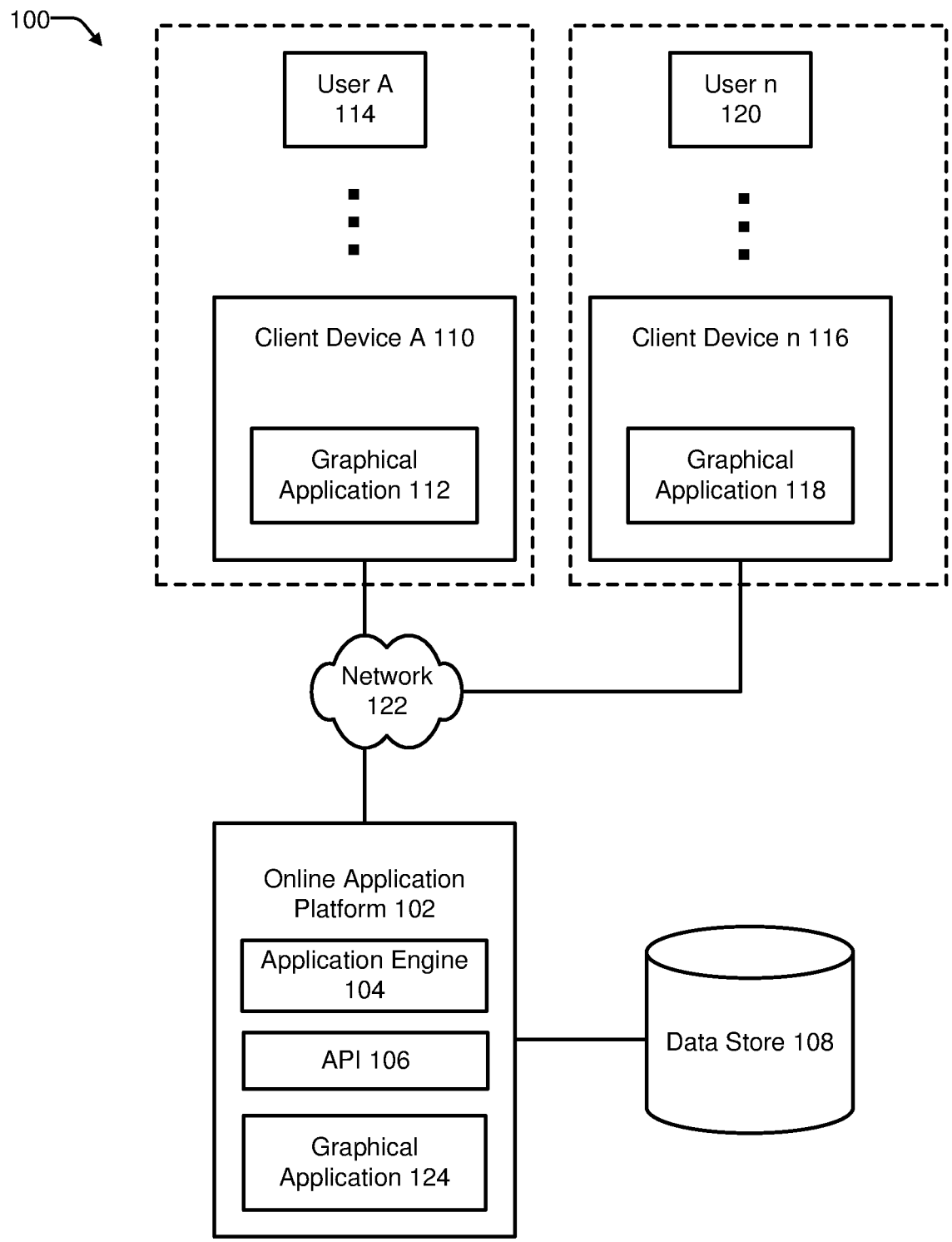
FIG. 1 is a diagram of an example network environment for computer-assisted graphical development tools, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online gaming or application platforms (also referred to as "user-generated content platforms" or "user-generated content systems") offer a variety of ways for users to interact with one another. For example, users of an online application platform may work together towards a common goal, share various virtual items, send electronic messages to one another, and so forth. Users of an online application platform may also (e.g., if embodied as an online gaming platform) join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by one or more non-player characters (NPC) which may be computer-generated characters, e.g., when a single player is part of a game.

An online application platform may also allow users (developers) of the platform to create new graphical content, games, characters, and/or other content. For example, users of the online application platform may be enabled to create, design, and/or customize new characters or avatars, items, or other content, and make them available to other users.

New user content may be generated and created using a computer-assisted graphical development suite or studio. For example, the development suite may include a plurality of graphical development tools and/or software packages arranged as a virtual design studio enabling a user to create new graphical objects, characters, avatars, items, clothing, accessories, and/or other graphical content. The graphical objects can be associated with one or more online games or virtual experiences, for example. Furthermore, the graphical objects can be associated with one or more users (e.g., as available avatars or items), can be associated with one or more websites (e.g., as profile photos, videos, and/or animated graphical objects), can be associated with one or more computer-executable code portions (e.g., as video files, image files, etc.), and/or can be associated with any suitable use case including a computer or computing device.

When working with computer-assisted graphical development tools, users typically use a virtual tool to manipulate graphical objects. For example, a virtual tool for graphical manipulation may be termed a dragger, handle, widget, manipulator, deformer, and/or a combination of any of these terms. As used herein, the phrase "dragger handle" is used to describe any of these virtual tools and similar tools.

Generally, a user may utilize a dragger handle to create new objects, to deform objects, to scale objects, to move objects, to align objects, and/or otherwise manipulate a graphical object. The user may utilize a dragger handle to move a graphical object around a 3D environment, metaverse place, or other medium that they are creating. Clicking and/or dragging the dragger handles, or providing other input with references to the dragger handles, allows the user to manipulate the object(s) in one or more ways.

Generally, dragger handles may be positioned, at least initially, about or in reference to the graphical object's origin point. The dragger handles may also be positioned, at least initially, at a surface, a mesh, one or more edges, or one or more vertices of the graphical object. The dragger handles may also be positioned, at least initially, about or in reference to a virtual pivot point established for the graphical object. Furthermore, at least in some implementations, the virtual pivot point may be positioned and retained in relation, or, in direct correlation to a graphical object's origin point.

Generally, an origin point may be established as the center of a bounding box for the graphical object. However, the origin point may be user-configurable and/or user-selectable. For example, for a graphical object representing a tree, the origin point may be near the bottom center of the trunk so that it's easy to drag the tree at the root of its trunk; for a graphical object representing a door, the origin point may be moved based on user-selection to where a hinge is at the edge so that when the door rotates, it "opens" properly. Other variations on origin points are also applicable.

As described in more detail herein, during execution of the computer-assisted graphical development tools, the dragger handles and/or virtual pivot point(s) may be used as reference to implement movement features automatically. For example, while working with computer-assisted graphical development tools, a user may wish to implement a movement feature such that a graphical object can be moved, similar to a dragger handle, within a second virtual environment.

The movement feature may be implemented as a logical coupling of a new movement object to the graphical object. For example, a user may request that a movement feature be implemented for a graphical object. The request may include receiving a path of motion for the object and position change values (e.g., max and min motion values). Thereafter, implementations may include automatically creating a movement detector object, and linking or coupling the movement detector object to the graphical object. The movement detector object may be operative to detect avatar motions and interaction within a second GUI, such as a virtual experience. Accordingly, the movement detector object is configured such that interaction with the graphical object by an avatar within the virtual experience triggers the movement detector object and causes automatic presentation of motion of the graphical object along the path of motion during the interaction.

In this manner, if a user requests a movement feature, the movement feature may be automatically generated and linked to the graphical object, such that the new linked graphical object can be used in a second GUI (e.g., such as a virtual environment) without necessitating further coding by the user. Technical effects and benefits include reduced coding by users and developers, improved developer and user engagement with a virtual experience platform, reduced effort in creating new virtual experiences, as well as improved functionality for newly created games or virtual experiences by novices.

Hereinafter, an example networking environment for implementing computer-assisted graphical development tools, software, application programming interfaces (APIs), game studios, design studios, and other suitable alternatives is presented with reference to FIG. 1.

FIG. 1: Network Environment

FIG. 1 illustrates an example network environment 100, in accordance with some implementations of the disclosure. FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The network environment 100 (also referred to as a "system" herein) includes an online application platform 102, a first client device 110, a second client device 116 (generally referred to as "client devices 110/116" herein), and a network 122. The network 122 may communicate through any plurality of locales or other additional networks, providing for communication between the client devices 110/116 and the online application platform 102.

The online application platform 102 can include, among other things, an application engine 104, an API 106, and a data store 108. The client device 110 can include a graphical application 112. The client device 116 can include a graphical application 118. Users 114 and 120 can use client devices 110 and 116, respectively, to interact with the online application platform 102. Users 114 and 120 can use client devices 110 and 116, respectively, to create graphical object(s), manipulate graphical object(s), store computer files describing graphical object(s), transmit computer files describing graphical object(s), and/or direct the online application platform 102 to send/transmit computer files describing the graphical object(s) to one or more websites, online gaming platforms, and/or other suitable locations.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online application platform 102 can include a server having one or more computing devices (e.g., a cloud computing system, a rackmount server, a server computer, cluster of physical servers, virtual server, etc.). In some implementations, a server may be included in the online application platform 102, be an independent system, or be part of another system or platform.

In some implementations, the online application platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online application platform 102 and to provide a user with access to online application platform 102. The online application platform 102 may also include a website (e.g., one or more webpages) or application back-end software that may be used to provide a user with access to content provided by online application platform 102. For example, users may access online application platform 102 using the graphical application 112/118 on client devices 110/116, respectively.

In some implementations, online application platform 102 may include a type of social network providing connections between users or a type of user-generated content system that allows users (e.g., end-users or consumers) to communicate with other users via the online application platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online application platform 102 may be an online virtual experience platform and/or a virtual gaming platform. For example, the virtual experience platform may provide virtual experiences to a community of users that may access or interact with virtual experiences (e.g., user generated virtual experiences or other virtual experiences) using client devices 110/116 via network 122. In some implementations, virtual experiences (also referred to as "video game," "game," "online game," or "virtual game" herein) may be two-dimensional (2D) virtual experiences, three-dimensional (3D) virtual experiences (e.g., 3D user-generated games), virtual reality (VR) games, or augmented reality (AR) games, for example. In some implementations, users may search for virtual experiences and virtual items, and participate in gameplay with other users in one or more virtual experiences. In some implementations, a virtual experiences may be interacted with in real-time with other users of the virtual experiences.

In some implementations, other collaboration platforms can be used with content generation features described herein instead of or in addition to online application platform 102. For example, a social networking platform, purchasing platform, messaging platform, creation platform, etc. can be used.

In some implementations, gameplay may refer to interaction of one or more players using client devices (e.g., 110 and/or 116) within a virtual experiences or the presentation of the interaction on a display or other output device of a client device 110 or 116.

In some implementations, one or more virtual experiences are provided by the online application platform. In some implementations, a virtual experience can include an electronic file that can be executed or loaded using software, firmware or hardware configured to present the virtual experiences content (e.g., digital media item) to an entity. In some implementations, a graphical application 112/118 may be executed and a virtual experience rendered in connection with graphical objects created/manipulated through the graphical application 112/118. In some implementations, a virtual experience may have a common set of rules or common goal, and the environments of a virtual experience share the common set of rules or common goal. In some implementations, different virtual experiences may have different rules or goals from one another. In some implementations, a virtual experience may have a shared set of graphical objects created by different users, and the environments of a virtual experience share the graphical objects for selection by different users. In some implementations, different virtual experiences may have different graphical objects from one another.

In some implementations, virtual experiences and other applications may have one or more environments (also referred to as "metaverse places," "metaverse environments," "gaming environments," or "virtual environments" herein) where multiple environments may be linked. An example of an environment may be a three-dimensional (3D) environment. The one or more environments may be collectively referred to a "world" or "metaverse" or "virtual world" or "universe" herein. An example of a world may be a 3D world of a virtual experience or graphical environment. For example, a user may build a virtual environment that is linked to another virtual environment created by another user. A character or graphical object of the virtual environment may cross the virtual border to enter the adjacent virtual environment.

It may be noted that 3D environments or 3D worlds use graphics that use a three-dimensional representation of geometric data representative of content (or at least present game content to appear as 3D content whether or not 3D representation of geometric data is used). 2D environments or 2D worlds use graphics that use two-dimensional representation of geometric data representative of content.

In some implementations, the online application platform 102 can host one or more virtual experiences and can permit users to interact with the virtual experiences (e.g., search for virtual experiences, experience-related content, graphical content, or other content) using a graphical application 112/118 of client devices 110/116. Users (e.g., 114 and/or 120) of the online application platform 102 may play, create, interact with, or build virtual experiences, search for virtual experiences, communicate with other users, create and build objects (e.g., also referred to as "item(s)" or "graphical objects" or "virtual item(s)" herein) of virtual experiences, and/or search for objects. For example, in generating user-generated virtual items, users may create characters, decoration for the characters, one or more virtual environments for an interactive experience, or build structures used in a virtual experience or other application, among others.

In some implementations, users (e.g., 114 and/or 120) of the online application platform 102 may create, build, and distribute content through use of the API 106. During creation and building, or subsequent thereto, the users of the online application platform 102 may distribute the entirety or portions of the created content.

In some implementations, users may buy, sell, or trade virtual graphical objects, such as in-platform currency (e.g., virtual currency), with other users of the online application platform 102. In some implementations, online application platform 102 may transmit graphical or virtual content to graphical applications (e.g., 112). In some implementations, graphical content (also referred to as "content" herein) may refer to any data or software instructions (e.g., graphical objects, game(s), user information, video, images, commands, media item, etc.) associated with online application platform 102 or graphical applications 112/118.

In some implementations, graphical objects (e.g., also referred to as "item(s)" or "objects" or "virtual item(s)" herein) may refer to objects that are used, created, shared or otherwise depicted in graphical applications 105 of the online application platform 102 or graphical applications 112 or 118 of the client devices 110/116. For example, graphical objects may include a part, model, character, tools, weapons, clothing, buildings, vehicles, currency, flora, fauna, components of the aforementioned (e.g., windows and/or walls of a building), and so forth.

It may be noted that the online application platform 102 hosting graphical applications (e.g., such as virtual experiences, games, or online games), is provided for purposes of illustration, rather than limitation. In some implementations, online application platform 102 may host one or more media items that can include communication messages from one user to one or more other users. Media items can include, but are not limited to, digital video, digital movies, digital photos, digital music, audio content, melodies, website content, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a graphical object(s) and/or virtual environments may be associated with a particular user or a particular group of users (e.g., a private game, private environment), or made widely available to users of the online application platform 102 (e.g., a public game or public environment). In some implementations, where online application platform 102 associates one or more graphical object(s) and/or virtual environments with a specific user or group of users, online application platform 102 may associate the specific user(s) with a particular graphical object(s) and/or virtual environment(s) using user account information (e.g., a user account identifier such as username and password). In these circumstances, the API 106 may also facilitate privatizing a particular graphical object(s) and/or virtual environment(s).

In some implementations, online application platform 102 or client devices 110/116 may include an application engine 104 or graphical application 124/112/118. The application engine 104 can include a graphical application (e.g., 124) similar to graphical application 112/118. In some implementations, application engine 104 may be used for the development or execution of graphical content. For example, application engine 104 may include a rendering engine ("renderer") for 2D, 3D, VR, or AR graphics, a development suite or studio, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the application engine 104 may generate commands that help compute and render graphical objects (e.g., rendering commands, collision commands, physics commands, etc.). In some implementations, graphical applications 112/118 of client devices 110/116, respectively, may work independently, in collaboration with application engine 104 of online application platform 102, or a combination of both.

In some implementations, both the online application platform 102 and client devices 110/116 execute an application engine (104, 124, 112, and 118, respectively). The online application platform 102 using application engine 104 may perform some or all the application engine functions (e.g., generate physics commands, rendering commands, etc.), or offload some or all the application engine functions to application engine 104 of client device 110. In some implementations, each graphical application 112/118 may have a different ratio between the application engine functions that are performed on the online application platform 102 and the application engine functions that are performed on the client devices 110 and 116.

For example, in a virtual experience scenario including an activity, the application engine 104 of the online application platform 102 may be used to generate physics commands in cases where there is a collision between at least two virtual objects, while the additional application engine functionality (e.g., generate rendering commands) may be offloaded to the client device 110. In some implementations, the ratio of application engine functions performed on the online application platform 102 and client device 110 may be changed (e.g., dynamically) based on gameplay conditions. For example, if the number of users participating in gameplay of a virtual experience activity exceeds a threshold number, the online application platform 102 may perform one or more application engine functions that were previously performed by the client devices 110 or 116.

For example, users may be interacting with a virtual experience on client devices 110 and 116, and may send control instructions (e.g., user inputs, such as right, left, up, down, user election, or character position and velocity information, etc.) to the online application platform 102. Subsequent to receiving control instructions from the client devices 110 and 116, the online application platform 102 may send gameplay instructions (e.g., position and velocity information of the characters participating in the group gameplay or commands, such as rendering commands, collision commands, etc.) to the client devices 110 and 116 based on control instructions. For instance, the online application platform 102 may perform one or more logical operations (e.g., using application engine 104) on the control instructions to generate gameplay instruction for the client devices 110 and 116. In other instances, online application platform 102 may pass one or more of the control instructions from one client device 110 to other client devices (e.g., 116) participating in the virtual experience. The client devices 110 and 116 may use the gameplay instructions and render the gameplay for presentation on the displays of client devices 110 and 116.

In some implementations, the control instructions may refer to instructions that are indicative of in-experience actions of a user's character. For example, control instructions may include user input to control the in-experience action, such as right, left, up, down, user selection, gyroscope position and orientation data, force sensor data, etc. The control instructions may include character position and velocity information. In some implementations, the control instructions are sent directly to the online application platform 102. In other implementations, the control instructions may be sent from a client device 110 to another client device (e.g., 116), where the other client device generates gameplay instructions using the local application engine 104. The control instructions may include instructions to play a voice communication message or other sounds from another user on an audio device (e.g., speakers, headphones, etc.).

In some implementations, gameplay instructions may refer to instructions that allow a client device 110 (or 116) to render gameplay of a virtual experience, such as a multiplayer game. The gameplay instructions may include one or more of user input (e.g., control instructions), character position and velocity information, or commands (e.g., physics commands, rendering commands, collision commands, etc.).

In some implementations, characters (or virtual objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the virtual experience. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online application platform 102. In some implementations, creating, modifying, or customizing characters, other virtual objects, virtual experiences, or virtual environments may be performed by a user using a user interface (e.g., developer interface) and with or without scripting (or with or without an application programming interface (API 106)). It may be noted that for purposes of illustration, rather than limitation, characters are described as having a humanoid form. In may further be noted that characters may have any form such as a vehicle, animal, inanimate object, or other creative form.

In some implementations, the online application platform 102 may store characters created by users in the data store 108. In some implementations, the online application platform 102 maintains a character catalog and graphical object catalog that may be presented to users via the application engine 104 and/or client device 110/116. In some implementations, the graphical object catalog includes images of graphical objects stored on the online application platform 102. In addition, a user may select a character (e.g., a character created by the user or other user) from the character catalog to participate in a chosen virtual experience. The graphical object catalog includes images of characters and graphical objects stored on the online application platform 102. In some implementations, one or more of the graphical objects in the graphical object catalog may have been created or customized by the user. In some implementations, the chosen graphical object may have settings defining one or more of additional components and/or additional graphical objects.

In some implementations, a character or avatar (e.g., a type of graphical object) can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character or graphical object catalog that has predefined character settings, and the user may further customize the default character by changing some of the character settings (e.g., adding a shirt with a customized logo). The character settings may be associated with a particular character by the online application platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online application platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the graphical application 112 or 118, respectively. In one implementation, the graphical application 112 or 118 may permit users to use and interact with online application platform 102, such as search for creating and/or manipulating graphical content, control a virtual character in a virtual game hosted by online application platform 102, or view or upload content, such as new games or developed graphical objects, images, video items, web pages, documents, and so forth. In one example, the graphical application may be a web application (e.g., an application that operates in conjunction with a web browser) that can access, retrieve, present, or navigate content (e.g., to develop objects and virtual environments, etc.) served by a web server. In another example, the graphical application may be a native application (e.g., a mobile application, app, or a gaming program) that is installed and executes local to client device 110 or 116 and allows users to interact with online application platform 102. The graphical application may render, display, or present the content (e.g., a web page, a user interface, a media viewer) to a user. In an implementation, the graphical application may also include an embedded media player (e.g., a Flash® player) that is embedded in a web page.

According to aspects of the disclosure, the graphical application 112/118 may be an online application platform application for users to build, create, edit, upload content to the online application platform 102 as well as interact with online application platform 102 (e.g., play games hosted by online application platform 102 or interact with virtual experiences). As such, the graphical application 112/118 may be provided to the client device 110 or 116 by the online application platform 102. In another example, the graphical application 112/118 may be an application that is downloaded from a server.

In some implementations, a user may login to online application platform 102 via the graphical application. The user may access a user account by providing user account information (e.g., username and password) where the user account is associated with one or more characters or graphical objects available to online application platform 102.

In general, functions described as being performed by the online application platform 102 can also be performed by the client device(s) 110 or 116, or a server, in other implementations if appropriate. In addition, the functionality attributed to a particular component can be performed by different or multiple components operating together. The online application platform 102 can also be accessed as a service provided to other systems or devices through appropriate application programming interfaces (APIs), and thus is not limited to use in websites.

In some implementations, online application platform 102 may include an API 106. In some implementations, the API 106 may be a system, application, software code, or module that enables the online application platform 102 to expose functions and/or modules configured to execute on a computer device and facilitate creation and manipulation of graphical objects, or other content, within the online application platform 102. In some implementations, the API 106 may facilitate, in concert with the application engine 104 and online application platform 102, one or more of the operations described below in connection with the flowcharts shown in FIGS. 6, and 7, utilizing the features illustrated in FIGS. 1-5. It is further noted, that the API 106 may provide an interface of instructions exposed to a developer including dragger handle settings, repositioning settings, auto-alignment settings, alignment settings, input settings, and other settings, for example.

Generally, the API 106 may be exposed to a developer and may present one or more functions that extend typical graphical object creation through use of the computer-assisted graphical development tools described herein. For example, the API 106 may include functions such as Location (e.g., dragger handle location, movement detector object location, etc.), Scale (e.g., how large or small to render dragger handles, whether to scale dragger handles with an object and/or with a viewport, etc.), Color (e.g., color of each dragger handle, multiple dragger handles, variations, etc.), and other functionality.

Hereinafter, a more detailed discussion of generation and manipulation of graphical content and/or graphical objects are presented with reference to FIGS. 2-5.

FIGS. 2-5 Graphical User Interfaces

Figure 2:
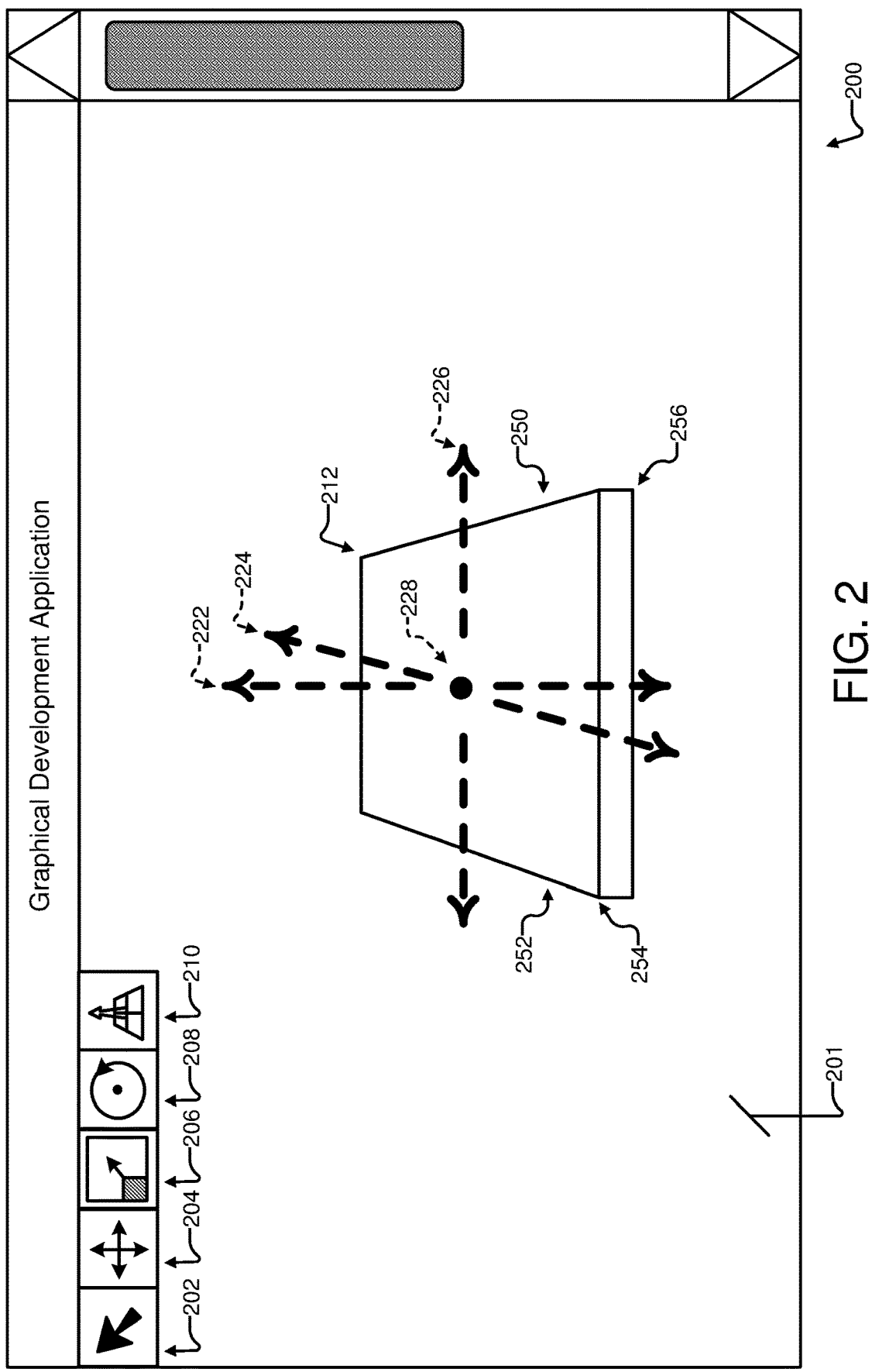
FIG. 2 is a schematic of a graphical user interface (GUI) for computer-assisted graphical development, in accordance with some implementations.

FIG. 2 is a schematic of a graphical user interface (GUI) 200 for computer-assisted graphical development, in accordance with some implementations. The GUI 200 may include a viewport 201 configured to display elements, graphical objects, and renderings of the same to user(s) (e.g., through client device 110/118). As used herein, a viewport is defined as a portion of a GUI that includes a work area that is visible to a user, for example, on a display screen or display apparatus of a computer device. The viewport may include only a portion of a work area, an entire work area, and/or portions of multiple work areas, depending upon how a user manipulates a zoom function, shift function, scroll function, and other functions of the GUI. In some implementations, a viewport always includes tools and/or elements of the GUI; while in other implementations, a viewport does not include tools and/or elements of the GUI, which are instead displayed at or near a periphery of the viewport. In some implementations, the work area is defined as a "view" of the content being created, whether on a 2D canvas or a view into a 3D world or virtual experience. Furthermore, in some implementations, there may be multiple/plural viewports, simultaneous or provided in sequence, such that alternate views (e.g., bottom perspective, top perspective, angular perspective, etc.) may be viewed simultaneously or in sequence. In scenarios with multiple viewports, dragger handles may be moved in one, some, or all of the multiple viewports. Other alterations to viewports may be applicable.

The GUI 200 may include, at least, one or more computer-assisted graphical development tools 202, 204, 206, 208, and 210 (visual icons for the tools) displayed thereon. For example, a single graphical development tool may be displayed at a time. Alternatively, more than one graphical development tool may be displayed at a time. Each graphical development tool may be selectable by a user, for example, through user input. Furthermore, each graphical development tool may implement a different graphical manipulation action. While particular forms of graphical manipulations are contemplated, virtually any manipulative action may be represented by one or more computer-assisted graphical development tools. Therefore, detailed discussion of each particular tool, each particular action, and/or each associated user input to effectuate said action, is omitted herein for the sake of brevity.

The GUI 200 further includes a manipulable graphical object 212 rendered therein. The at least one manipulable graphical object 212 may have one or more edges 250, 252 (not all edges are labeled in FIG. 2) and/or vertices 254, 256 (not all vertices are labeled in FIG. 2) and/or a virtual pivot point 228. The manipulable graphical object 212 may also include one or more surfaces or mesh representing surfaces and/or features. The virtual pivot point 228 may be a virtual point of reference about which the graphical object 212 may be transformed, manipulated, and/or otherwise adjusted/changed.

The GUI 200 also includes one or more dragger handles 222, 224, and 226. In some implementations, dragger handles 222, 224, and 226 may be positioned, at least initially, about or in reference to the graphical object's origin point, which may be aligned with the virtual pivot point 228. The dragger handles 222, 224, and 226 may also be positioned, at least initially, at the edges (250, 252) or vertices (254, 256). The dragger handles 222, 224, and 226 may also be positioned, at least initially, about or in reference to virtual pivot point 228 established for the graphical object 212. Furthermore, at least in some implementations, the virtual pivot point 228 may be positioned and retained in relation, or, in direct correlation to the graphical object's origin point, e.g., centroid, center of gravity, or other origin point. Moreover, the dragger handles 222, 224, and 226 may also be positioned, at least initially, in reference to one or more surfaces and/or mesh associated with the manipulable graphical object 212.

According to some implementations, origin points differ depending upon user-preferences, user-configurations, and/or shapes/centroids of objects being created and manipulated. For example, if a user is creating a new graphical avatar, an origin point may be established as a bottom/center between feet or the center of mass. In other examples, objects may have a hierarchy and may also have multiple origins(e.g., the avatar's origin might be the root between its feet, but there may also be an arm scope with an origin by the shoulder, child lower arm scope with origin at the elbow, child hand scope, etc.). Similarly, an object such as a pizza may include an origin point near or at its center, but there may be children "slices of pizza" in a hierarchy that have different origins around the crust. As a further example, for a graphical object representing a tree, the origin point may be near the bottom center of the trunk so that it's easy to drag the tree at the root of its trunk; for a graphical object representing a door, the origin point may be moved based on user-selection to where a hinge is at the edge so that when the door rotates, it "opens" properly. Other variations on origin points are also applicable. Other variations of origin points are also applicable.

In some implementations, the virtual pivot point 228 may be positioned at least initially in relation, or, in direct correlation to a graphical object's origin point.

Each of the dragger handles 222, 224, and 226 may represent a different axis of manipulation for the graphical object 212. For example, dragger handle 222 may include a first set of arrows, and may be operative to enable changes in the Y axis; dragger handle 224 may include a second set of arrows, and may be operative to enable changes in the Z axis; and dragger handle 226 may include a third set of arrows, and may be operative to enable changes in the X axis. Each arrow element may be displayed in a unique color, similar colors to other arrow elements, or in slightly differing colors or gradients of color. According to at least one implementation, each arrow element can be displayed in a different color from other arrow elements. Furthermore, although illustrated as having dashed lines, it should be understood that any format including solid lines, multiple solid lines, different dashes, non-arrowed lines, and other variations are also applicable to the elements of dragger handles.

A user may scroll, pan, and otherwise change a perspective and/or view from within the viewport 201 using the dragger handles. Responsive to these changes, the graphical object may appear to move, slide or otherwise change position along the associated axis or path of motion. In these scenarios, a user may wish to implement the same or similar motions such that the graphical object 212 may be moved in the same manner within a virtual experience.

Figure 3:
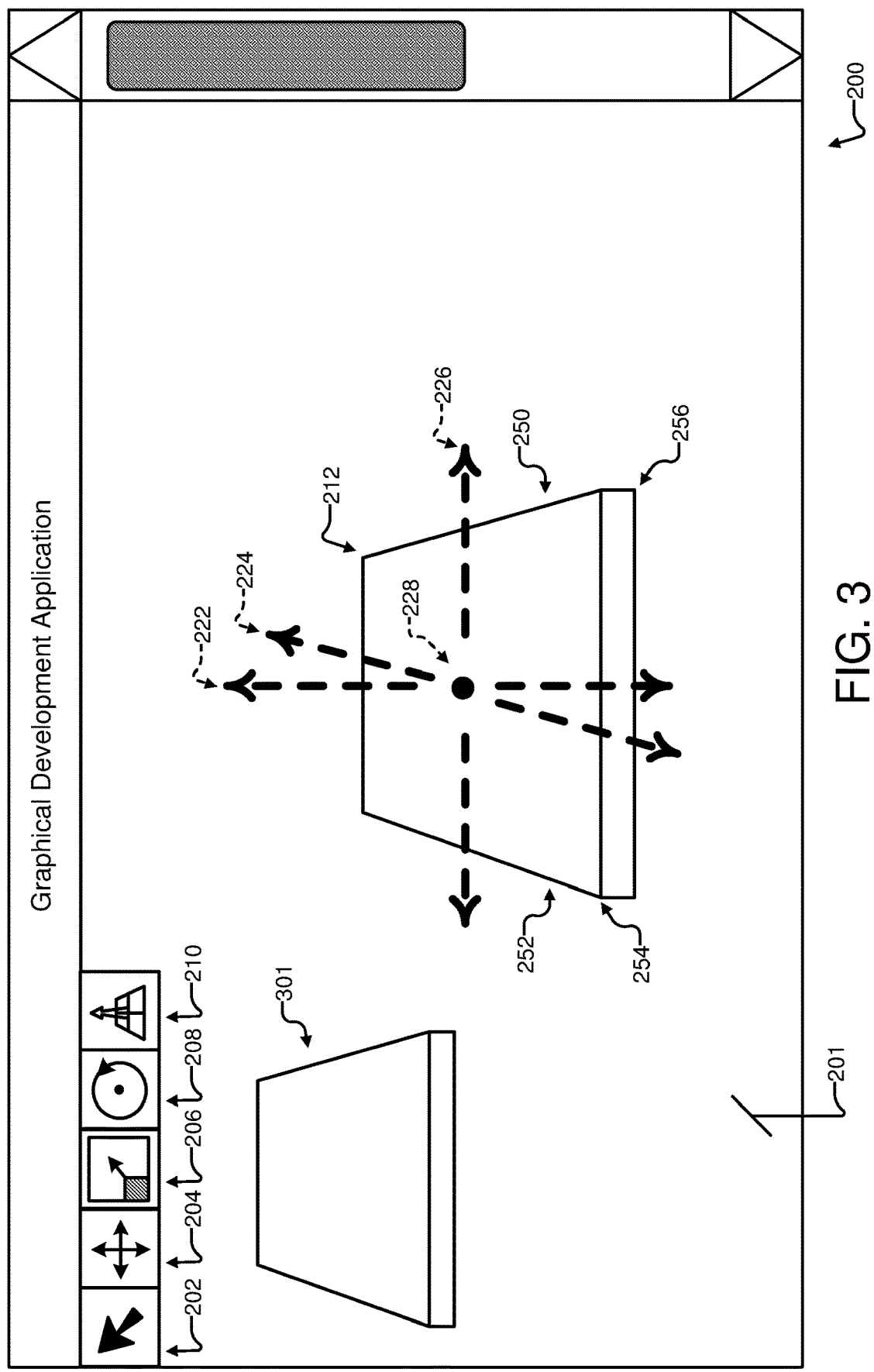
FIG. 3 is a schematic of a GUI for computer-assisted graphical development, in accordance with some implementations.

FIG. 3 is an alternative schematic of the GUI 200 for computer-assisted graphical development, in accordance with some implementations. As shown in FIG. 3, an additional graphical object 301 has been rendered in the GUI 200. Both graphical objects 212 and 301 may be used to request separate or linked movement features as described in detail herein.

For example, graphical objects 301 and 212 may be illustrated as rudimentary objects in FIG. 3, but may be representative of more complex virtual objects. For example, graphical object 212 may represent a drawer sliding against a cabinet bottom of graphical object 301. In this manner, graphical objects 212 and 301 may be linked such that the graphical object 212 moves in relation to the graphical object 301, along a path of drawer slides or tracks. Furthermore, movement of graphical object 301 may move graphical object 212 as though it were connected as a cabinet drawer against the cabinet bottom.

In addition to examples related to virtual furniture, the same may be varied to any number of virtual objects, such as ropes, pulleys, sliders, doors, and others. Different objects may be linked according to physical principles of movement (e.g., a rope may turn a pulley, or a door may swing in relation to a wall, etc.). These virtual objects may be linked accordingly, and motion of the objects may be handled automatically with the various aspects disclosed herein. Other variations may also be applicable.

Figure 4:
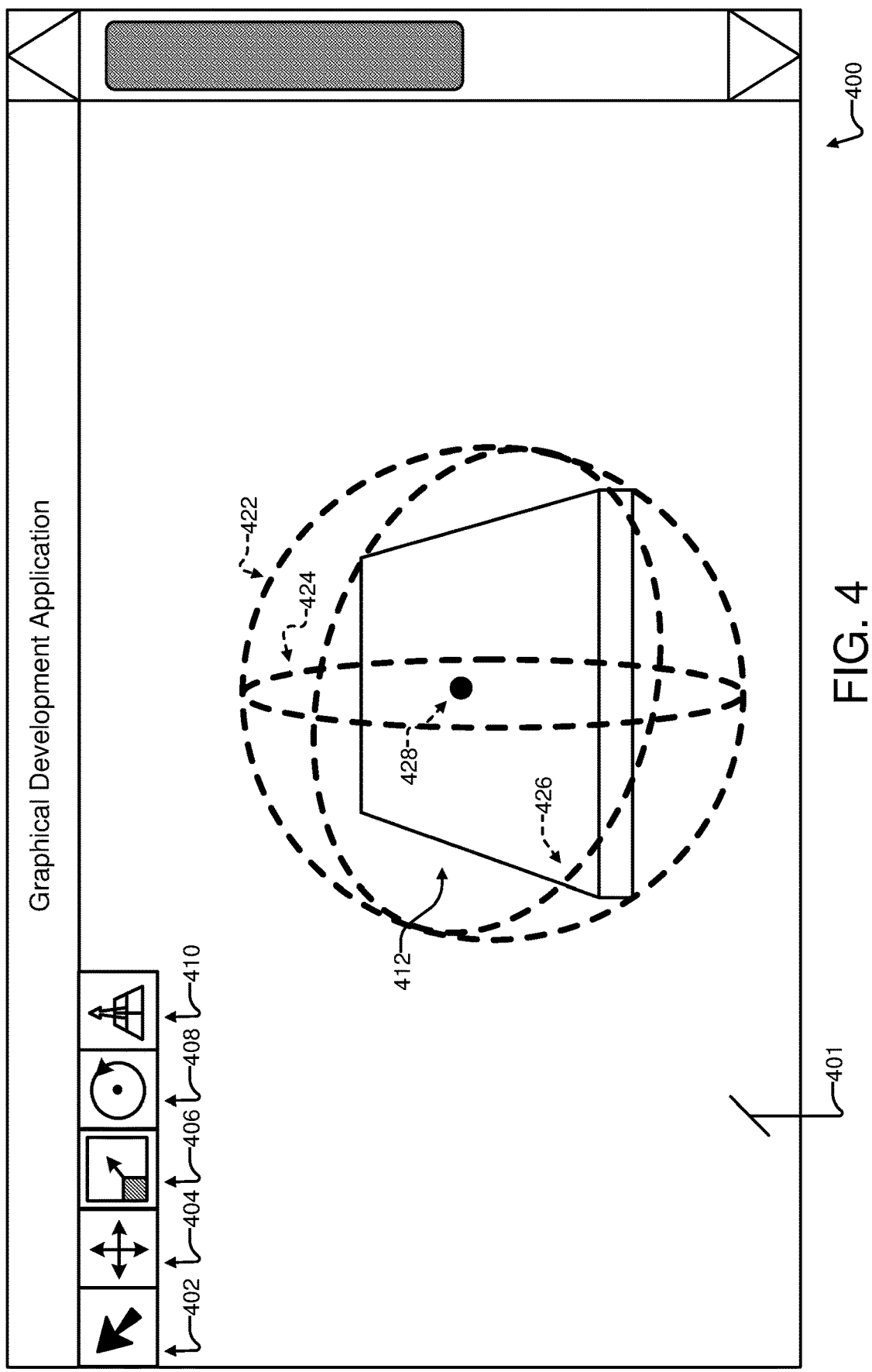
FIG. 4 is a schematic of a GUI for computer-assisted graphical development, in accordance with some implementations.

FIG. 4 is a schematic of a GUI 400 for computer-assisted graphical development, in accordance with some implementations. The GUI 400 may include a viewport 401 configured to display elements, graphical objects, and renderings of the same to user(s) (e.g., through client device 110/118). The GUI may include, at least, one or more computer-assisted graphical development tools 402, 404, 406, 408, and 410 displayed thereon. For example, a single graphical development tool may be displayed at a time. Alternatively, more than one graphical development tool may be displayed at a time. Each graphical development tool may be selectable by a user, for example, through user input. Furthermore, each graphical development tool may implement a different graphical manipulation action. While particular forms of graphical manipulations are contemplated, virtually any manipulative action may be represented by one or more computer-assisted graphical development tools. Therefore, detailed discussion of each particular tool, each particular action, and/or each associated user input to effectuate said action, is omitted herein for the sake of brevity.

The GUI 400 further includes a manipulable graphical object 412 rendered therein. The manipulable graphical object 412 may have one or more surfaces, one or more meshes, one or more edges, and/or one or more vertices (not labeled), and/or a virtual pivot point 428. The virtual pivot point 428 may be a virtual point of reference about which the graphical object 412 may be transformed, manipulated, and/or otherwise adjusted/changed.

The GUI 400 also includes dragger handles 422, 424, and 426. Generally, dragger handles 422, 424, and 426 may be positioned, at least initially, about or in reference to the graphical object's origin point, which may be aligned with the virtual pivot point 428. The dragger handles 422, 424, and 426 may also be positioned, at least initially, at the edges or vertices. The dragger handles 422, 424, and 426 may also be positioned, at least initially, about or in reference to virtual pivot point 428 established for the graphical object 412. Moreover, the dragger handles 422, 424, and 426 may also be positioned, at least initially, in reference to one or more surfaces and/or mesh associated with the graphical object 412.

According to some implementations, origin points differ depending upon user-preferences, user-configurations, and/or shapes/centroids of objects being created and manipulated. For example, if a user is creating a new graphical avatar, an origin point may be established as a bottom/center between feet or the center of mass. In other examples, objects may have a hierarchy and may also have multiple origins(e.g., the avatar's origin might be the root between its feet, but there may also be an arm scope with an origin by the shoulder, child lower arm scope with origin at the elbow, child hand scope, etc.). Similarly, an object such as a pizza may include an origin point near or at its center, but there may be children "slices of pizza" in a hierarchy that have different origins around the crust. As a further example, for a graphical object representing a tree, the origin point may be near the bottom center of the trunk so that it's easy to drag the tree at the root of its trunk; for a graphical object representing a door, the origin point may be moved based on user-selection to where a hinge is at the edge so that when the door rotates, it "opens" properly. Other variations on origin points are also applicable. Other variations of origin points are also applicable.

Furthermore, at least in some implementations, the virtual pivot point 428 may be positioned and retained in relation, or, in direct correlation to the graphical object's origin point. In other implementations, the virtual pivot point 428 may be positioned at least initially in relation, or, in direct correlation to a graphical object's origin point.

Each of the dragger handles 422, 424, and 426 may represent a different axis of rotation-type manipulation for the graphical object 412. For example, dragger handle 422 may be a first arcuate element, and may be operative to enable changes and/or rotation in relation to the Y axis; dragger handle 424 may be a second arcuate element, and may be operative to enable changes and/or rotation in relation to the Z axis; and dragger handle 426 may be a third arcuate element, and may be operative to enable changes and/or rotation in relation to the X axis. Each arcuate element may be displayed in a unique color, similar colors to other arcuate elements, or in slightly differing colors or gradients of color. According to at least one implementation, each arcuate element can be displayed in a different color from other arcuate elements. Furthermore, although illustrated as having dashed lines, it should be understood that any format including solid lines, multiple solid lines, different dashes, and other variations are also applicable to arcuate elements of the dragger handles.

A user may scroll, pan, and otherwise change a perspective and/or view from within the viewport 401 using the dragger handles. Responsive to these changes, the graphical object 412 may appear to move in an arcuate or rotating motion based on the dragger handle activity. In these scenarios, a user may wish to implement the same or similar motions such that the graphical object 412 may be moved in the same manner within a virtual experience.

Figure 5:
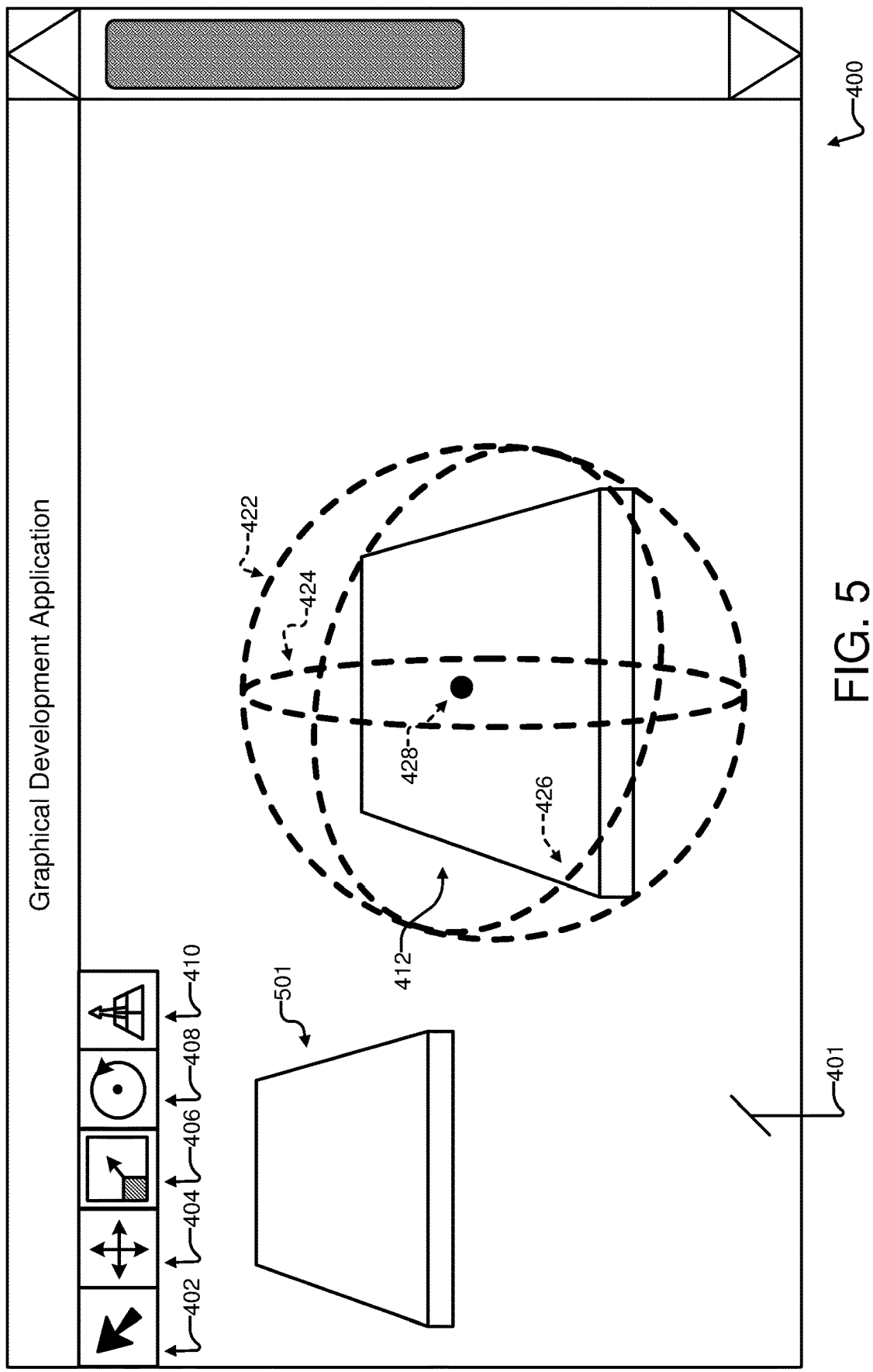
FIG. 5 is a schematic of a GUI for computer-assisted graphical development, in accordance with some implementations.

FIG. 5 is an alternative schematic of the GUI 400 for computer-assisted graphical development, in accordance with some implementations. As shown in FIG. 5, an additional graphical object 501 has been rendered in the GUI 400. Both graphical objects 412 and 501 may be used to request separate or linked movement features as described in detail herein.

For example, graphical objects 501 and 412 may be illustrated as rudimentary objects in FIG. 5, but may be representative of complex virtual objects. For example, graphical object 412 may represent a ball rolling within a rail formed of graphical object 501. In this manner, graphical objects 412 and 501 may be linked such that the graphical object 412 moves in relation to the graphical object 501, along a path of tracks or rail. Furthermore, movement of graphical object 501 may move graphical object 412 as though it were connected as a railing having a ball deposited therein.

In addition to examples related to virtual sports equipment, the same may be varied to any number of virtual objects, such as cabinets, ropes, pulleys, sliders, doors, and others. Different objects may be linked according to physical principles of movement (e.g., a pulley may lift a rope connected to another object, or a slider switch on virtual audio equipment may move along a defined slider rail, etc.). These virtual objects may be linked accordingly, and motion of the objects may be handled automatically with the various aspects disclosed herein. Other variations may also be applicable.

It is noted that while illustrated as separate and distinct dragger handles and scenarios, any of the features of GUI 200 and GUI 400 may be combined to form a singular GUI. Moreover, elements from each of GUI 200 and GUI 400 may be readily interchanged to implement an additional aspect or implementation.

Furthermore, aspects of each of GUI 200 and GUI 400 may be combined in partial form, for example, by interchanging a single dragger handle with another, or a single graphical manipulation tool with another.

Hereinafter, methods of operation and functions of computer-assisted graphical development tools and associated components are described in detail with reference to FIGS. 6 and 7.

Figure 6:
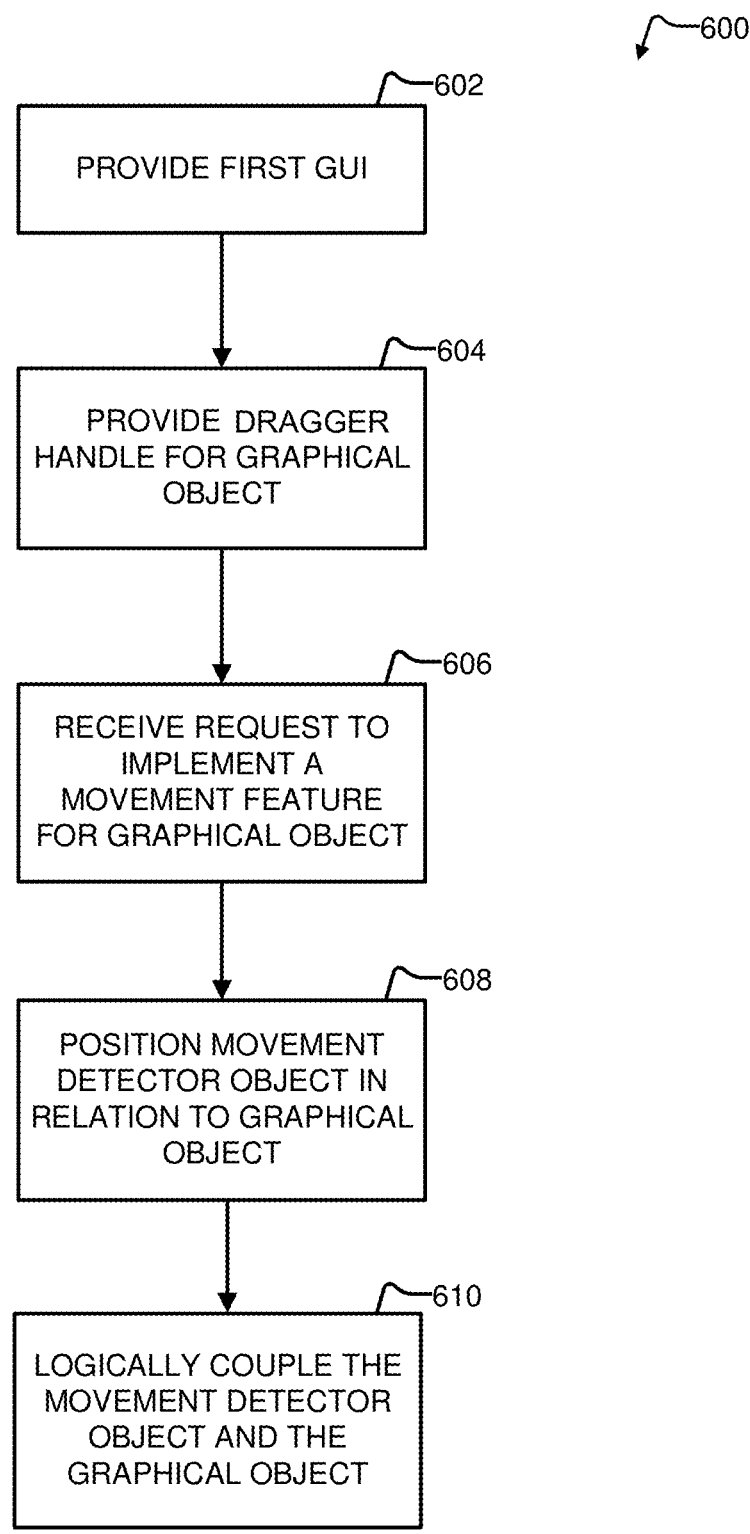
FIG. 6 is a flowchart illustrating an example method of computer-assisted graphical development, in accordance with some implementations.
Figure 7:
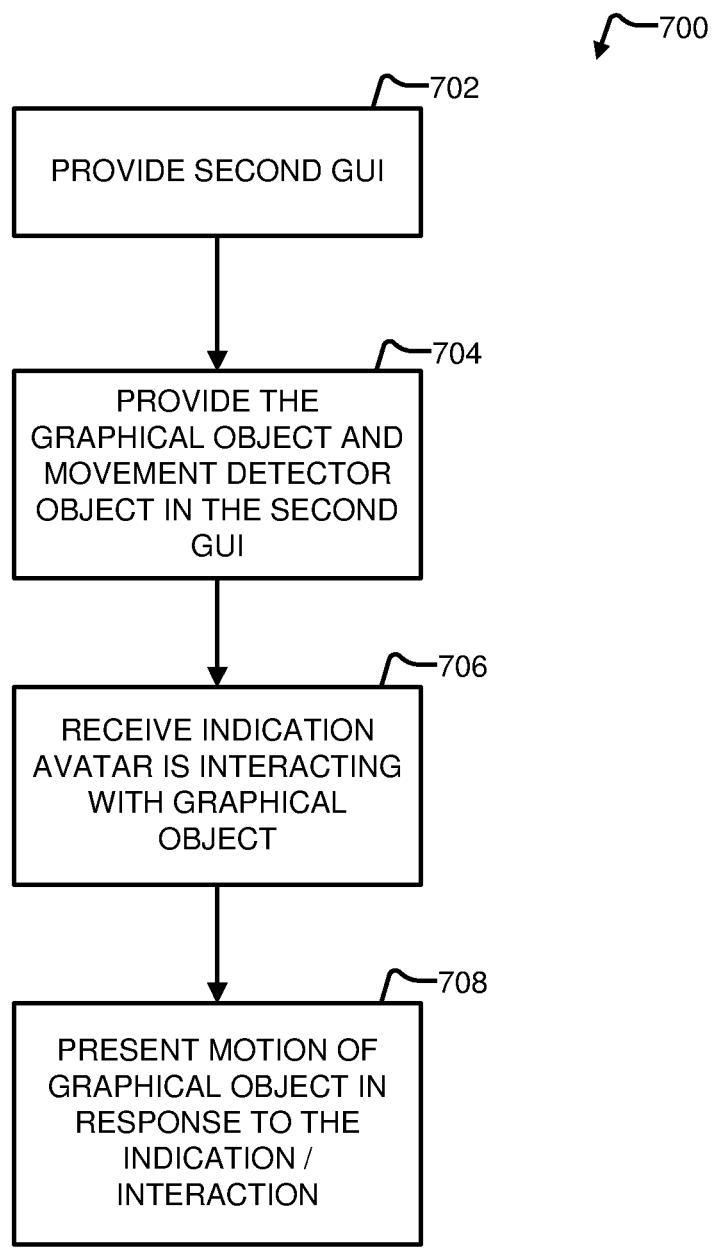
FIG. 7 is a flowchart illustrating another example method of computer-assisted graphical development, in accordance with some implementations.

FIGS. 6-7: Methods of Operation

FIG. 6 is a flowchart illustrating an example method 600 of computer-assisted graphical development, in accordance with some implementations. The method 600 begins at block 602. At block 602, a first graphical user interface (GUI) that includes at least one manipulable graphical object is provided. The at least one manipulable graphical object having at least one edge or vertex and being associated with a virtual pivot point.

For example, various graphical objects may be representative of the at least one manipulable graphical object. In some implementations, the at least one manipulable graphical object may include a virtual item from a virtual experience. In some implementations, the at least one manipulable graphical object is a virtual representation of a physical object (e.g., a ball, rope, pulley, door, etc.). In these examples, the at least one manipulable graphical object may be associated with (or include) inherent movement constraints or properties (e.g., a ball can roll or bounce, a door may swing, a locking mechanism may turn, etc.). Block 602 is followed by block 604.

At block 604, a dragger handle is provided in the first GUI. The dragger handle may be proximate the at least one manipulable graphical object in the first GUI. The dragger handle may be operable via user input to alter a location of the at least one manipulable graphical object based on the virtual pivot point.

For example, the dragger handle may be at least initially positioned based upon movement properties defined by a data structure of the at least one manipulable graphical object. In some implementations, the data structure is a logical file or a logical data model that describes at least one movement property of the at least one manipulable graphical object. It is noted that in some implementations, all movement may be feasible or applicable, and no inherent movement properties may be defined.

In some implementations, the dragger handle is configured to be displayed in the first GUI, but not in a second GUI provided for interacting with the object in a virtual experience. Block 606 is followed by block 608.

At block 608, a request to implement a movement feature may be received. For example, the request may be to implement a movement feature for the at least one manipulable graphical object. The movement feature may include motion of the at least one manipulable graphical object within a virtual experience by an avatar.

For example, a user may request to implement the movement feature by selecting an option in a GUI, recording motion in a GUI, and/or others. For example, in some implementations, the request includes a definition of a movement path (e.g., line, arc, loop, etc.).

In some implementations, the request may include the path of motion, a minimum position change value, and a maximum position change value. For example, the minimum position change value and the maximum position change value denote threshold positions along the path of motion where the at least one manipulable graphical object cannot travel beyond.

In some implementations, the path of motion is: a linear path, an arcuate path, or an axis of rotation configured in relation to one or more of: the virtual pivot point, or the at least one edge or vertex of the manipulable graphical object.

The request may also include other data, such as other movement limits, alternate movement paths, and others. Block 608 is followed by block 610.

At block 610, in response to the request, the method includes automatically positioning a movement detector object in relation to the at least one manipulable graphical object. The movement detector object may be oriented along a path of motion defined in the request. The movement detector object may be operable to detect interactions of the avatar with the at least one manipulable graphical object within the virtual experience, and the movement detector object is configured to direct motion of the at least one manipulable graphical object along the path of motion in relation to the virtual pivot point.

For example, the movement detector may be an invisible virtual sensing object or "detector," that is configured to detect an avatar within a threshold distance from the movement detector. In this manner, the movement detector may not be visible in the first GUI or the second GUI.

In some implementations, the movement detector includes one or more of data representing the path of motion, data describing the virtual pivot point, a minimum position change value in relation to the virtual pivot point and the path of motion, or a maximum position change value in relation to the virtual pivot point and the path of motion.

In some implementations, the movement detector includes computer-executable code to automatically detect proximity of the avatar to the at least one edge or vertex in a second GUI, a presentation GUI, and/or a virtual experience.

Additionally, in some implementations, a plurality of dragger handles and/or movement detectors are possible. In this manner, several different paths of motion based upon multiple dragger handles and/or movement detectors is possible. Furthermore, in some implementations, multiple paths of motion may be defined by or with the dragger handles and/or movement detectors, such that several different paths of motion based on a single dragger handle and/or movement detector are also possible. Other variations may also be applicable.

Block 610 may be followed by block 612.

At block 612, the movement detector object is logically coupled to the at least one manipulable graphical object in the first GUI. While not illustrated, the method 600 can further include providing the linked or logically coupled manipulable graphical object and movement detector object to a second GUI, such as a virtual experience.

The movement detector object and the at least one manipulable graphical object, when rendered in a virtual experience, may provide for movement as defined in the initial request. For example, as an avatar approaches the movement detector and interacts with the at least one manipulable graphical object, the virtual experience engine may render motion based upon the avatar's motion and along the defined path(s) of motion for the at least one manipulable graphical object, as if the avatar were directly moving the virtual object with the movement detector and/or dragger handle. In this manner, avatars can interact with objects that have been automatically placed and logically coupled movement detectors and dragger handles.

Other implementation features may also be applicable. For example, blocks 602-610 can be performed (or repeated) in a different order than described above and/or one or more steps can be omitted. Furthermore, portions or the entirety of blocks 602-610 may be iterated until a user finishes and/or exits a graphical application. Similarly, portions or the entirely of blocks 602-610 may be iterated until a user completes an entire scene or portion of a scene of a virtual environment or metaverse place. Other changes may also be applicable.

FIG. 7 is a flowchart illustrating an additional example method 700 of computer-assisted graphical development, in accordance with some implementations. The method 700 begins at block 702. At block 702, a second graphical user interface (GUI) is provided. Block 702 is followed by block 704.

At block 704, the at least one manipulable graphical object and the movement detector are provided in the virtual experience presented in the second GUI. In the second GUI, interaction with the at least manipulable graphical object by the avatar within the virtual experience triggers the movement detector object and causes automatic presentation of motion of the at least one manipulable graphical object along the path of motion during the interaction.

For example, different kinds of motion may indicate different paradigms for mapping user input to different virtual geometry—e.g., dragging along a line tracks the closest point on a virtual line to the cursor location; rotating about an axis can include projecting onto a plane and tracking the change in angle between successive plane-points and a center of rotation; and others. These and other forms of motion may be enabled by the automatically placed movement detector.

Block 704 is followed by block 706.

At block 706, an indication that an avatar is interacting with the at least one manipulable graphical object is received. For example, an avatar within a threshold distance of the at least one manipulable graphical object may provide the indication (e.g., based on user input from a user associated with the avatar). Additionally, in some implementations, an avatar's terminal end (such as a hand or foot) may also provide the indication, when the terminal end of the avatar is within the threshold distance of the at least one manipulable graphical object. Block 706 is followed by block 708.

At block 708, in response to the indication, motion of the at least one manipulable graphical object is presented in the second GUI, during the interaction. For example, as an avatar approaches the movement detector and interacts with the at least one manipulable graphical object, the virtual experience engine may render motion for the at least one manipulable graphical object based upon the avatar's motion and along the defined path(s) of motion, as if the avatar were directly moving the virtual object with the movement detector and/or dragger handle. In this manner, avatars can interact with objects that have automatically placed and logically coupled movement detectors and dragger handles.

In some implementations, the presentation of the motion can include rendering the motion along the path of motion, and, when the interaction ceases, the at least one manipulable graphical object is rendered at rest proximate a point of last interaction. For example, the interactions by the avatar can include one or more of: pushing, pulling, lifting, sliding, or rotating.

In some implementations, the presentation of the motion can include rendering the motion along the path of motion, and, if the at least one manipulable graphical object is above a ground level when the interaction ceases, rendering the at least one manipulable graphical object falling to the ground level or into a nearest object below the at least one manipulable graphical object. In this manner, movements that mimic a natural environment may be rendered.

Other implementation features may also be applicable. For example, blocks 702-708 can be performed (or repeated) in a different order than described above and/or one or more steps can be omitted. Furthermore, portions or the entirety of blocks 702-708 may be performed one or more times until a user finishes and/or exits a graphical application. Similarly, portions or the entirely of blocks 702-708 may be performed one or more times until a user completes an entire scene or portion of a scene of a virtual environment or metaverse place. Other changes may also be applicable.

Hereinafter, details related to computing devices that may be used to implement the above and other features are described with reference to FIG. 8.

Figure 8:
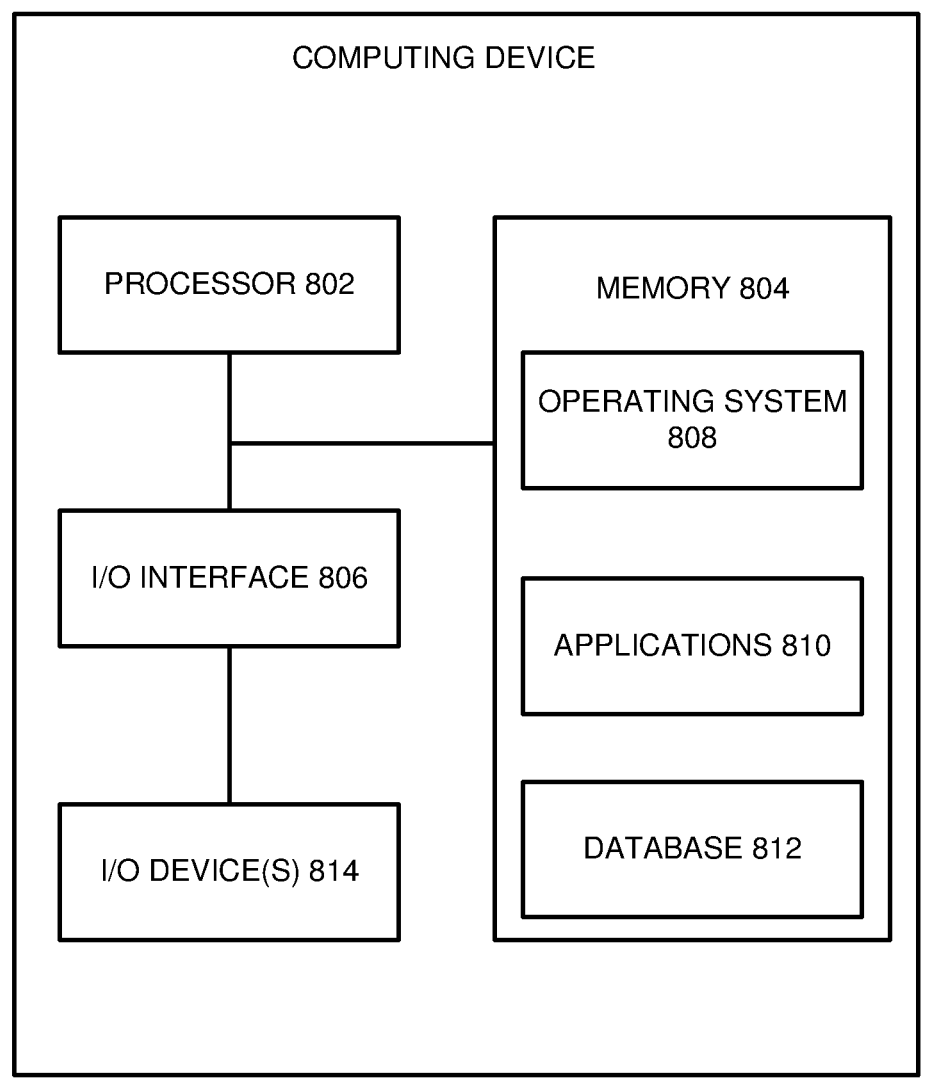
FIG. 8 is a block diagram illustrating an example computing device, in accordance with some implementations.

FIG. 8: Computing Devices

FIG. 8 is a block diagram of an example computing device 800 which may be used to implement one or more features described herein. In one example, device 800 may be used to implement a computer/client device (e.g. 110 of FIG. 1), and perform appropriate method implementations (e.g. 600 of FIG. 6 and 700 of FIG. 7) described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, one or more applications 810, and database 812. In some implementations, application 810 can include instructions that enable processor 802 to perform the functions (or control the functions of) described herein, e.g., some or all of the methods described with respect to FIG. 6 and FIG. 7.

For example, applications 810 can include a graphical application (e.g., to allow graphical content creation and manipulation) and/or database module 812, which can store user-created graphical objects and content for an online application or gaming server. Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 120, 122), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 814 can include a user input device (e.g., a mouse, a touchscreen, a touchpad, a microphone, etc.) that can be used to receive user input, a display device (e.g., screen, monitor, touchscreen etc.) and/or a combined input and display device, that can be used to provide graphical and/or visual output.

For ease of illustration, FIG. 8 shows one block for each of processor 802, memory 804, I/O interface 806, and software blocks 808 and 810. These blocks may represent one or more processors or processing circuitries, operating systems, memories, I/O interfaces, applications, and/or software engines. In other implementations, device 800 may not have all of the components shown and/or may have other elements including other types of elements instead of, or in addition to, those shown herein. While the online application platform 102 is described as performing operations as described in some implementations herein, any suitable component or combination of components of online application platform 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse or touchpad for capturing user input, a gesture device for recognizing a user gesture, a VR/AR input device (e.g., such as an orientation sensor) for recognizing a head pose or gaze, a touchscreen to detect user input, a microphone to capture user input, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 600 and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
providing a first graphical user interface (GUI) that includes at least one manipulable graphical object, the at least one manipulable graphical object having at least one edge or vertex and being associated with a virtual pivot point;
providing a dragger handle proximate to the at least one manipulable graphical object in the first GUI, the dragger handle operable via user input to alter a location of the at least one manipulable graphical object based on the virtual pivot point;
receiving a request to implement a movement feature for the at least one manipulable graphical object, wherein the movement feature includes motion of the at least one manipulable graphical object within a virtual experience by an avatar;
in response to the request, automatically positioning a movement detector object in relation to the at least one manipulable graphical object and the dragger handle, and logically coupling the movement detector object to the at least one manipulable graphical object, wherein the movement detector object is oriented along a path of motion defined in the request, wherein the movement detector object is operable to detect interactions of the avatar with the at least one manipulable graphical object within the virtual experience, and wherein the movement detector object is configured to direct motion of the at least one manipulable graphical object along the path of motion in relation to the virtual pivot point; and
providing the at least one manipulable graphical object and the movement detector object in the virtual experience presented in a second GUI, wherein interaction with the at least one manipulable graphical object by the avatar within the virtual experience triggers the movement detector object and causes automatic presentation of motion of the at least one manipulable graphical object along the path of motion.

2. The computer-implemented method of claim 1, wherein the dragger handle is configured to be displayed in the first GUI and is not displayed in the second GUI, and wherein the movement detector object is a hidden object that is not displayed in the first GUI and is not displayed in the second GUI.

3. The computer-implemented method of claim 1, wherein receiving the request comprises receiving the path of motion, a minimum position change value, and a maximum position change value.

4. The computer-implemented method of claim 3, wherein the minimum position change value and the maximum position change value denote threshold positions along the path of motion that the at least one manipulable graphical object cannot travel beyond.

5. The computer-implemented method of claim 1, wherein the at least one manipulable graphical object is a three-dimensional (3D) object, wherein providing the dragger handle comprises providing two or more dragger handles along two or more distinct paths of motion, and wherein receiving the request comprises receiving a selection of one of the two or more distinct paths of motion.

6. The computer-implemented method of claim 1, wherein the path of motion is: a linear path, an arcuate path, or an axis of rotation configured in relation to one or more of: the virtual pivot point, or the at least one edge or vertex.

7. The computer-implemented method of claim 1, wherein the automatic presentation of motion of the at least one manipulable graphical object along the path of motion within the virtual experience comprises rendering the motion along the path of motion, and wherein, when the interaction ceases, the at least one manipulable graphical object is rendered at rest proximate to a point of last interaction.

8. The computer-implemented method of claim 1, wherein the interaction with the at least one manipulable graphical object by the avatar within the virtual experience comprises one or more of: pushing, pulling, lifting, sliding, or rotating.

9. The computer-implemented method of claim 1, wherein the automatic presentation of motion of the at least one manipulable graphical object along the path of motion within the virtual experience comprises rendering the motion along the path of motion, and, if the at least one manipulable graphical object is above a ground level when the interaction ceases, rendering the at least one manipulable graphical object falling to the ground level or into a nearest object below the at least one manipulable graphical object.

10. The computer-implemented method of claim 1, wherein the movement detector object is a hidden virtual object that comprises one or more of: data representing the path of motion, data describing the virtual pivot point, a minimum position change value in relation to the virtual pivot point and the path of motion, or a maximum position change value in relation to the virtual pivot point and the path of motion.

11. The computer-implemented method of claim 10, wherein the movement detector object comprises computer-executable code that automatically detects proximity of the avatar to the at least one edge or vertex in the second GUI.

12. The computer-implemented method of claim 11, wherein the movement detector object is a first movement detector object, wherein the path of motion is a first path of motion, wherein the request is a first request, and wherein the computer-implemented method further comprises:
receiving a second request to implement a second movement feature for the at least one manipulable graphical object;
in response to the second request, automatically positioning a second movement detector object in relation to the at least one manipulable graphical object and logically coupling the second movement detector object to the at least one manipulable graphical object, wherein the second movement detector object is oriented along a second path of motion defined by the second request, wherein the second movement detector object is operable to detect avatar interactions with the at least one manipulable graphical object within the virtual experience, and wherein the second movement detector object is configured to direct motion of the at least one manipulable graphical object along the second path of motion in relation to the virtual pivot point; and
providing the at least one manipulable graphical object, the first movement detector object, and the second movement detector object in the virtual experience, wherein interaction with the at least one manipulable graphical object by an avatar within the virtual experience triggers the first movement detector object and the second movement detector object, and causes an automatic presentation of motion of the at least one manipulable graphical object along one or both of the first path of motion and the second path of motion within the virtual experience during the interaction.

13. A system, comprising:
a memory with instructions stored thereon; and
a processing device, coupled to the memory and operable to access the memory, wherein the instructions, when executed by the processing device, cause the processing device to perform operations including:
providing a first graphical user interface (GUI) that includes at least one manipulable graphical object, the at least one manipulable graphical object having at least one edge or vertex and being associated with a virtual pivot point;
providing a dragger handle proximate to the at least one manipulable graphical object in the first GUI, the dragger handle operable via user input to alter a location of the at least one manipulable graphical object based on the virtual pivot point;
receiving a request to implement a movement feature for the at least one manipulable graphical object, wherein the movement feature includes motion of the at least one manipulable graphical object within a virtual experience by an avatar;
in response to the request, automatically positioning a movement detector object in relation to the at least one manipulable graphical object and the dragger handle, and logically coupling the movement detector object to the at least one manipulable graphical object, wherein the movement detector object is oriented along a path of motion defined in the request, wherein the movement detector object is operable to detect interactions of the avatar with the at least one manipulable graphical object within the virtual experience, and wherein the movement detector object is configured to direct motion of the at least one manipulable graphical object along the path of motion in relation to the virtual pivot point; and
providing the at least one manipulable graphical object and the movement detector object in the virtual experience presented in a second GUI, wherein interaction with the at least one manipulable graphical object by the avatar within the virtual experience triggers the movement detector object and causes automatic presentation of motion of the at least one manipulable graphical object along the path of motion during the interaction.

14. The system of claim 13, wherein the dragger handle is configured to be displayed in the first GUI and is not displayed in the second GUI, and wherein the movement detector object is a hidden object that is not displayed in the first GUI and is not displayed in the second GUI.

15. The system of claim 13, wherein receiving the request comprises receiving the path of motion, a minimum position change value, and a maximum position change value.

16. The system of claim 15, wherein the minimum position change value and the maximum position change value denote threshold positions along the path of motion where the at least one manipulable graphical object cannot travel beyond.

17. The system of claim 13, wherein the at least one manipulable graphical object is a three-dimensional (3D) object, wherein providing the dragger handle comprises providing two or more dragger handles along two or more distinct paths of motion, and wherein receiving the request comprises receiving a selection of one of the two or more distinct paths of motion.

18. The system of claim 13, wherein the path of motion is: a linear path, an arcuate path, or an axis of rotation configured in relation to one or more of: the virtual pivot point, or the at least one edge or vertex.

19. The system of claim 13, wherein the automatic presentation of motion of the at least one manipulable graphical object along the path of motion within the virtual experience comprises rendering the motion along the path of motion, and wherein, when the interaction ceases, the at least one manipulable graphical object is rendered at rest proximate to a point of last interaction.

20. A non-transitory computer-readable medium with instructions stored thereon that, responsive to execution by a processing device, causes the processing device to perform operations comprising:
providing a first graphical user interface (GUI) that includes at least one manipulable graphical object, the at least one manipulable graphical object having at least one edge or vertex and being associated with a virtual pivot point;
providing a dragger handle proximate to the at least one manipulable graphical object in the first GUI, the dragger handle operable via user input to alter a location of the at least one manipulable graphical object based on the virtual pivot point;
receiving a request to implement a movement feature for the at least one manipulable graphical object, wherein the movement feature includes motion of the at least one manipulable graphical object within a virtual experience by an avatar;

in response to the request, automatically positioning a movement detector object in relation to the at least one manipulable graphical object and the dragger handle, and logically coupling the movement detector object to the at least one manipulable graphical object, wherein the movement detector object is oriented along a path of motion defined in the request, wherein the movement detector object is operable to detect interactions of the avatar with the at least one manipulable graphical object within the virtual experience, and wherein the movement detector object is configured to direct motion of the at least one manipulable graphical object along the path of motion in relation to the virtual pivot point; and providing the at least one manipulable graphical object and the movement detector object in the virtual experience presented in a second GUI, wherein interaction with the at least one manipulable graphical object by the avatar within the virtual experience triggers the movement detector object and causes automatic presentation of motion of the at least one manipulable graphical object along the path of motion during the interaction.

\* \* \* \* \*